(12) United States Patent
Satoh

(10) Patent No.: US 12,050,821 B2
(45) Date of Patent: Jul. 30, 2024

(54) INFORMATION PROCESSING APPARATUS, INFORMATION PROCESSING SYSTEM, INFORMATION PROCESSING METHOD, IMAGE FORMING APPARATUS, AND IMAGE FORMING SYSTEM FOR ACQUIRING A LOG RELATED TO COMMUNICATION AND EXECUTION OF A PROCESSING

(71) Applicant: Jun Satoh, Kanagawa (JP)

(72) Inventor: Jun Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/184,160

(22) Filed: Mar. 15, 2023

(65) Prior Publication Data

US 2023/0297298 A1 Sep. 21, 2023

(30) Foreign Application Priority Data

Mar. 18, 2022 (JP) .................................. 2022-044202
Nov. 15, 2022 (JP) .................................. 2022-182887

(51) Int. Cl.
*G06F 3/12* (2006.01)
*H04N 1/00* (2006.01)

(52) U.S. Cl.
CPC ............ *G06F 3/121* (2013.01); *G06F 3/1234* (2013.01); *G06F 3/1273* (2013.01); *H04N 1/0001* (2013.01); *H04N 1/00061* (2013.01); *H04N 1/0009* (2013.01)

(58) Field of Classification Search
CPC ...... G06F 3/121; G06F 3/1234; G06F 3/1273; H04N 1/0001; H04N 1/00061; H04N 1/0009
See application file for complete search history.

(56) References Cited

U.S. PATENT DOCUMENTS

| 8,520,247 B1 * | 8/2013 | Takaishi ................ G06F 3/1288 358/1.15 |
| 10,545,944 B2 * | 1/2020 | Ito .......................... G06F 16/183 |
| 2008/0065733 A1 | 3/2008 | Umetsu |
| 2008/0228937 A1 * | 9/2008 | Araumi ................. H04L 67/535 709/232 |
| 2009/0109462 A1 * | 4/2009 | Hiruma .............. H04N 1/00344 358/1.15 |

(Continued)

FOREIGN PATENT DOCUMENTS

| JP | 2008-071085 | 3/2008 |
| JP | 2008-097570 | 4/2008 |

*Primary Examiner* — Juan M Guillermety
(74) *Attorney, Agent, or Firm* — IPUSA, PLLC

(57) ABSTRACT

An information processing apparatus includes processing circuitry. The processing circuitry acquires a log related to communication and execution of processing and transmits the log to a log collection server. The processing circuitry stores a log related to a transmission failure in a memory storage when transmission of the log to the log collection server fails due to occurrence of an error. When the transmission of the log to the log collection server succeeds after the transmission failure, the processing circuitry stores a log related to a transmission success in the memory storage and transmits the log related to the transmission failure and the log related to the transmission success to the log collection server.

6 Claims, 7 Drawing Sheets

| LOG ID | EXECUTION CONTENT | EXECUTION DATE AND TIME | TRANSMISSION RESULT | ERROR OCCURRENCE |
|---|---|---|---|---|
| 001(S52) | COPYING EXECUTION(S51) | 20XX/10/11 13:15 | SUCCESS | NO |
| 002(S55) | COPYING EXECUTION(S54) | 20XX/10/11 14:20 | FAILURE | YES |
| 003 (S58) | COPYING EXECUTION(S54)<br>COPYING EXECUTION(S57)<br>LOG TRANSMISSION FAILURE(S55) | 20XX/10/11 14:20<br>20XX/10/11 15:30<br>20XX/10/11 14:30 | FAILURE | YES |
| 004 (S61) | COPYING EXECUTION(S54)<br>COPYING EXECUTION(S57)<br>COPYING EXECUTION(S60)<br>LOG TRANSMISSION FAILURE(S55)<br>LOG TRANSMISSION FAILURE(S58) | 20XX/10/11 14:20<br>20XX/10/11 25:30<br>20XX/10/11 30:40<br>20XX/10/11 14:30<br>20XX/10/11 25:40 | SUCCESS | NO |
| 005 (S64) | LOG TRANSMISSION SUCCESS(S61) | 20XX/10/11 30:50 | SUCCESS | NO |

(56) References Cited

U.S. PATENT DOCUMENTS

| | | | |
|---|---|---|---|
| 2012/0136967 A1* | 5/2012 | Ito | H04L 47/10 709/217 |
| 2013/0188216 A1* | 7/2013 | Katahira | H04W 76/18 358/1.14 |
| 2013/0227358 A1* | 8/2013 | Yokokura | G06F 11/0733 714/57 |
| 2015/0043036 A1* | 2/2015 | Kamma | G06F 3/121 358/1.15 |
| 2016/0364189 A1* | 12/2016 | Ogino | G06F 3/1211 |
| 2017/0272582 A1* | 9/2017 | Kobayashi | H04N 1/00095 |
| 2018/0267755 A1* | 9/2018 | Okazawa | G06F 3/121 |
| 2019/0196767 A1* | 6/2019 | Kashida | G06F 3/1288 |
| 2020/0117401 A1* | 4/2020 | Shibata | H04N 1/00042 |
| 2021/0037148 A1* | 2/2021 | Hasegawa | G06F 3/1234 |
| 2021/0157538 A1* | 5/2021 | Nakamura | G06F 3/1288 |

* cited by examiner

FIG. 6

| LOG ID | EXECUTION CONTENT | EXECUTION DATE AND TIME | TRANSMISSION RESULT | ERROR OCCURRENCE |
|---|---|---|---|---|
| 001(S52) | COPYING EXECUTION(S51) | 20XX/10/11 13:15 | SUCCESS | NO |
| 002(S55) | COPYING EXECUTION(S54) | 20XX/10/11 14:20 | FAILURE | YES |
| 003 (S58) | COPYING EXECUTION(S54)<br>COPYING EXECUTION(S57)<br>LOG TRANSMISSION FAILURE(S55) | 20XX/10/11 14:20<br>20XX/10/11 15:30<br>20XX/10/11 14:30 | FAILURE | YES |
| 004 (S61) | COPYING EXECUTION(S54)<br>COPYING EXECUTION(S57)<br>COPYING EXECUTION(S60)<br>LOG TRANSMISSION FAILURE(S55)<br>LOG TRANSMISSION FAILURE(S58) | 20XX/10/11 14:20<br>20XX/10/11 25:30<br>20XX/10/11 30:40<br>20XX/10/11 14:30<br>20XX/10/11 25:40 | SUCCESS | NO |
| 005 (S64) | LOG TRANSMISSION SUCCESS(S61) | 20XX/10/11 30:50 | SUCCESS | NO |

INFORMATION PROCESSING APPARATUS, INFORMATION PROCESSING SYSTEM, INFORMATION PROCESSING METHOD, IMAGE FORMING APPARATUS, AND IMAGE FORMING SYSTEM FOR ACQUIRING A LOG RELATED TO COMMUNICATION AND EXECUTION OF A PROCESSING

CROSS-REFERENCE TO RELATED APPLICATIONS

This patent application is based on and claims priority pursuant to 35 U.S.C. § 119(a) to Japanese Patent Application No. 2022-044202, filed on Mar. 18, 2022, and Japanese Patent Application No. 2022-182887, filed on Nov. 15, 2022, in the Japan Patent Office, the entire disclosures of which are hereby incorporated by reference herein.

BACKGROUND

Technical Field

Embodiments of the present disclosure relate to an information processing apparatus, an information processing system, an information processing method, an image forming apparatus, and an image forming system.

Related Art

For the purpose of analyzing an error or a malfunction that has occurred in electronic equipment, such as an information processing apparatus, or an image forming apparatus, there is a technique for storing logs, such as a communication history and an execution history, in a storage device, such as a hard disk (HD), and transmitting the logs to an external apparatus.

SUMMARY

In an embodiment of the present disclosure, an information processing apparatus includes processing circuitry. The processing circuitry acquires a log related to communication and execution of processing and transmits the log to a log collection server. The processing circuitry stores a log related to a transmission failure in a memory storage when transmission of the log to the log collection server fails due to occurrence of an error. When the transmission of the log to the log collection server succeeds after the transmission failure, the processing circuitry stores a log related to a transmission success in the memory storage and transmits the log related to the transmission failure and the log related to the transmission success to the log collection server.

In another embodiment of the present disclosure, an information processing system includes the information processing apparatus and the log collection server. The log collection server includes processing circuitry to receive a log from the information processing apparatus and a memory storage to store the logs.

In still another embodiment of the present disclosure, an image forming apparatus includes the information processing apparatus and an image former to form an image.

In still yet another embodiment of the present disclosure, an image forming system includes the image forming apparatus and the log collection server. The log collection server includes processing circuitry to receive a log from the information processing apparatus and a memory storage to store the logs.

In still yet further another embodiment of the present disclosure, an information processing method includes acquiring a log related to communication and execution of processing, transmitting the log to a log collection server; and storing a log related to a transmission failure when the transmitting of the log to the log collection server fails due to occurrence of an error. The method further includes, when the transmitting of the log to the log collection server succeeds after the transmission failure, storing a log related to a transmission success and transmitting the log related to the transmission failure and the log related to the transmission success to the log collection server.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a table for explaining logs to be transmitted to a log collection server according to an embodiment of the present disclosure.

Figure 1:
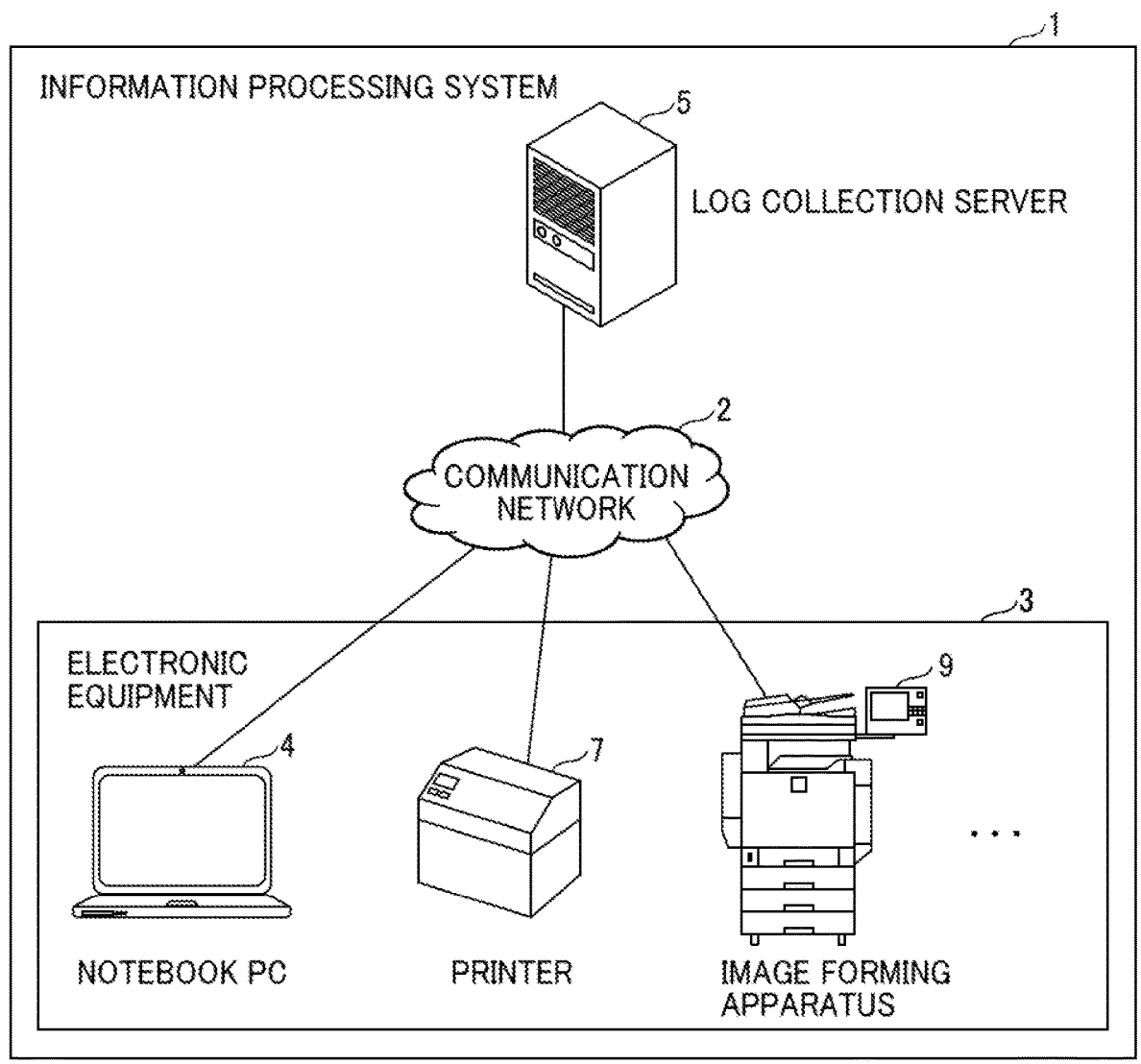
FIG. 1 is a diagram illustrating an example of a schematic view of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present disclosure, after log transmission fails due to an error, when the error is recovered and log transmission is successful, a log related to the transmission success is stored.

Hereinafter, embodiments of an information processing apparatus, an information processing system, an information processing method, an image forming apparatus, and an image forming system according to the present disclosure will be described in detail with reference to the accompanying drawings.

System Overview

FIG. 1 is a diagram illustrating an example of a schematic view of an information processing system according to an embodiment of the present disclosure. An information processing system 1 includes electronic equipment 3, such as a notebook personal computer (PC) 4, a printer 7, and an image forming apparatus 9, and a log collection server 5 that are connected to a communication network 2, such as the Internet or a local network. The electronic equipment 3 acquires logs, such as a communication history and a job processing execution history, (that is, logs related to communication and processing execution), and stores the logs in a storage device, and transmits the acquired log to the log collection server 5 via the communication network 2 (the transmission is referred to as log transmission). Not only in a case where log transmission fails, but also in a case where log transmission is successful, the electronic equipment 3 stores, in the storage device, a log related to the log transmission (that is, a log related to the transmission success), and further transmits, to the log collection server 5, the log related to the log transmission. Therefore, in the information processing system 1, after log transmission fails due to an error, when the error is recovered and log transmission is successful, a log related to the transmission success is stored to track a period in which the error has occurred. Further, when the error is recovered, the electronic equipment 3 may also transmit logs acquired during the occurrence of the error to the log collection server 5.

The system configuration of the information processing system 1 illustrated in FIG. 1 is an example. The communication network 2 may include a connection section with, for example, mobile communication or wireless communication, such as a wireless local area network (LAN). The number of the electronic equipment 3 included in the information processing system 1 may be any number. The electronic equipment 3 may be an information processing apparatus or the image forming apparatus 9.

Example of Hardware Configuration

Figure 2:
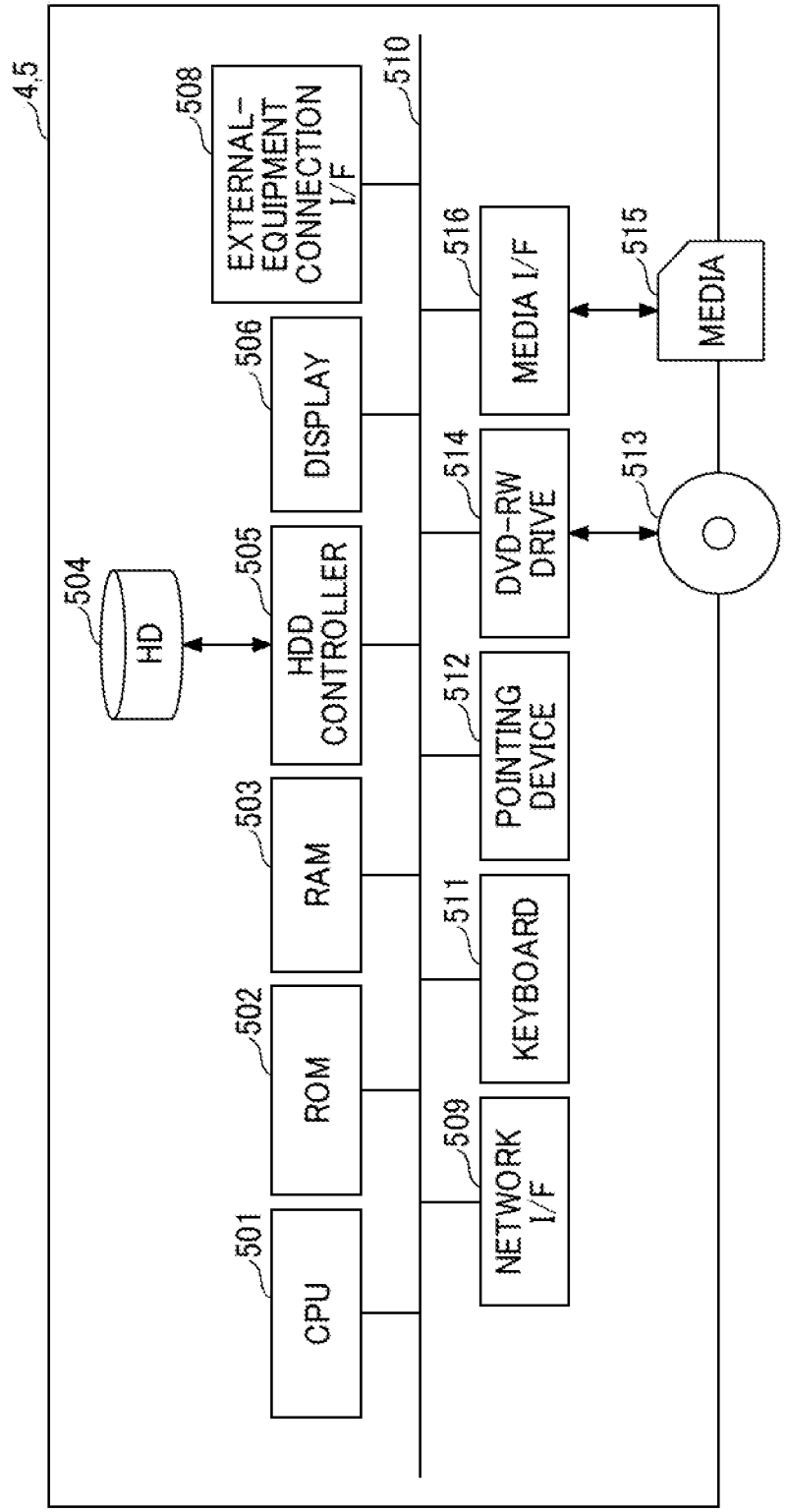
FIG. 2 is a diagram illustrating an example of a hardware configuration of an information processing apparatus according to an embodiment of the present disclosure.

FIG. 2 is a diagram illustrating an example of a hardware configuration of an information processing apparatus constituting the notebook PC 4, the log collection server 5, and the like according to an embodiment of the present disclosure. As illustrated in FIG. 2, the information processing apparatus is constructed with a computer, and includes a central processing unit (CPU) 501, a read-only memory (ROM) 502, a random-access memory (RAM) 503, a hard disk (HD) 504, a hard disk drive (HDD) controller 505, a display 506, an external-equipment connection interface (I/F) 508, a network I/F 509, a bus line 510, a keyboard 511, a pointing device 512, a digital versatile disk rewritable (DVD-RW) drive 514, and a media I/F 516.

Among these, the CPU 501 controls the operations of the entire information processing apparatus. The ROM 502 stores programs used to drive the CPU 501, such as initial program load (IPL). The RAM 503 is used as a work area for the CPU 501. The HD 504 stores various data, such as a program. The HDD controller 505 controls reading or writing of various data from or to the HD 504 according to the control of the CPU 501. The display 506 displays various types of information, such as a cursor, a menu, a window, characters, or an image. The external-equipment connection I/F 508 is an interface that couples to various external equipment. The external equipment in this case is, for example, a Universal Serial Bus (USB) memory, a printer, or the like. The network I/F 509 is an interface for data communication through the communication network 2. The bus line 510 is an address bus, a data bus, or the like for electrically coupling each component, such as the CPU 501 illustrated in FIG. 2.

The keyboard 511 is a type of input means including a plurality of keys used to input characters, numerical values, various instructions, or the like. The pointing device 512 is a type of input means to select and execute various instructions, select a processing target, move a cursor, and to do such a thing. The DVD-RW drive 514 controls reading or writing of various data from or to a DVD-RW 513 as an example of a detachable recording medium. The DVD-RW drive 514 is not limited to a DVD-RW, and may be a DVD recordable (DVD-R) or the like of a recording drive. The media I/F 516 controls reading or writing (storing) of data from or to a recording medium 515, such as a flash memory.

Hardware Configuration Example (Image Forming Apparatus)

Figure 3:
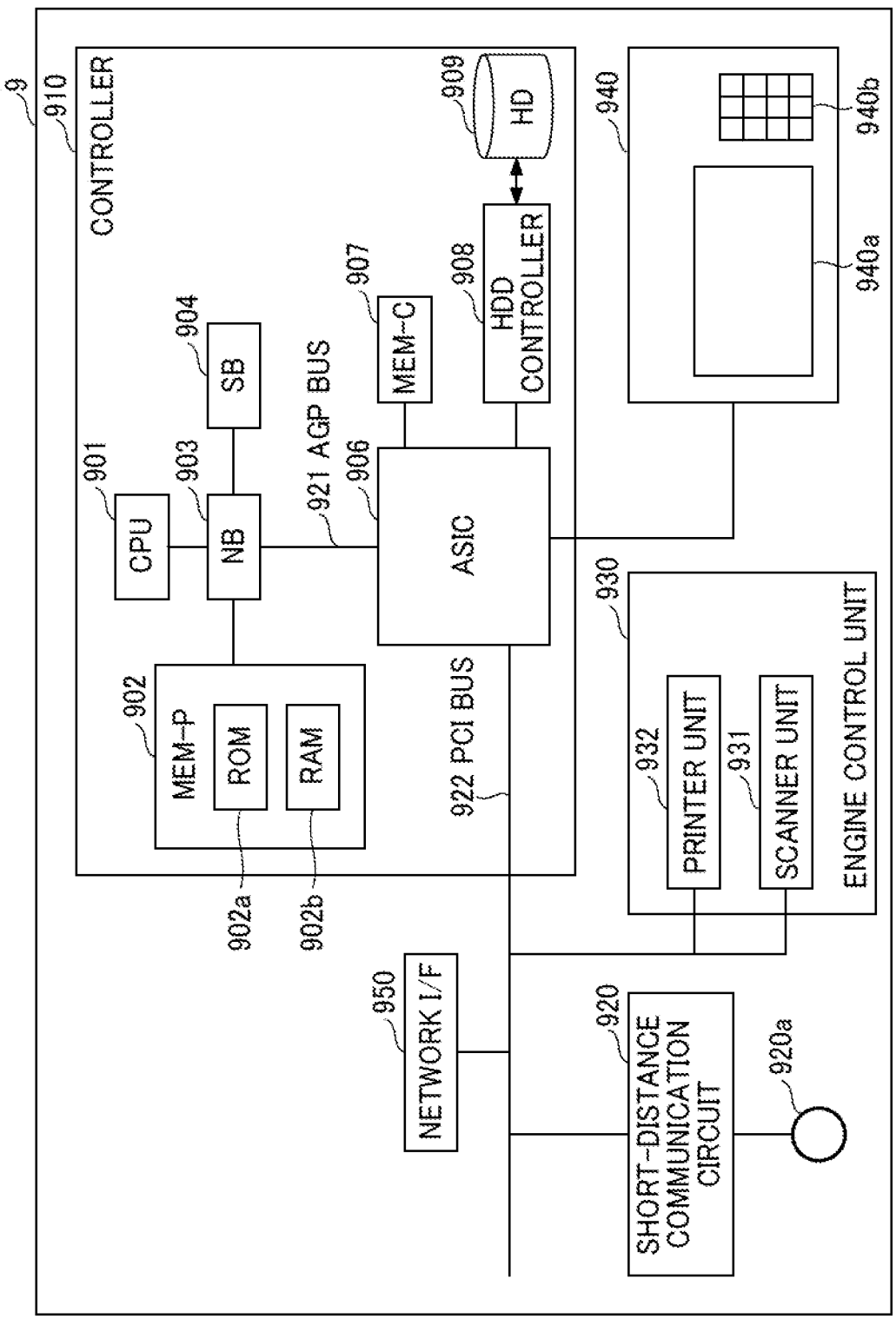
FIG. 3 is a diagram illustrating an example of a hardware configuration of an image forming apparatus according to an embodiment of the present disclosure.

FIG. 3 is a diagram illustrating an example of a hardware configuration of the image forming apparatus 9 according to an embodiment of the present disclosure. As illustrated in FIG. 3, the image forming apparatus 9 (alternatively referred to as a multifunction peripheral/product/printer (MFP)) includes a controller 910, a short-distance communication circuit 920, an engine control unit 930, an operation panel 940, and a network I/F 950.

Among these, the controller 910 includes a CPU 901, which is a main part of a computer, a system memory (MEM-P) 902, a north bridge (NB) 903, a south bridge (SB) 904, an application-specific integrated circuit (ASIC) 906, a local memory (MEM-C) 907, an HDD controller 908, and an HD 909. The NB 903 and the ASIC 906 are coupled by an Accelerated Graphics Port (AGP) bus 921.

Among them, the CPU 901 controls the entire image forming apparatus 9. The NB 903 is a bridge for coupling the CPU 901 to the MEM-P 902, the SB 904, and the AGP bus 921. The NB 903 includes a memory controller that controls reading and writing from and to the MEM-P 902, a Peripheral Component Interconnect (PCI) master, and an AGP target.

The MEM-P 902 includes a ROM 902a, which is a memory for storing programs and data for implementing each function of the controller 910, and a RAM 902b, which is used as a drawing memory or the like at a time of loading programs or data, and memory printing. To provide programs stored in the RAM 902b, the programs may be recorded as files in an installable format or an executable format in a computer-readable recording medium, such as a compact disk ROM (CD-ROM), a compact disc-recordable (CD-R), or a DVD.

The SB 904 is a bridge for coupling the NB 903 to a PCI device and a peripheral device. The ASIC 906 is an integrated circuit (IC) for image processing application and having hardware elements for image processing. The ASIC 906 serves as a bridge that couples the AGP bus 921, a PCI bus 922, the HDD controller 908, and the MEM-C 907 to each other. The ASIC 906 includes a PCI target, an AGP master, an arbiter (ARB) that forms the core of the ASIC 906, a memory controller that controls the MEM-C 907, and a plurality of direct memory access controllers (DMACs) that performs image data rotation and the like with hardware logics or the like.

The ASIC 906 also includes a PCI unit that performs data transmission between the PCI unit and a scanner unit 931 and a printer unit 932 via the PCI bus 922. The scanner unit 931 scans a document to input document image information. The printer unit 932 serving as an image former prints an image to form a print image, such as an electrophotographic printer unit or an ink jet printer unit. The engine control unit 930 controls the scanner unit 931 and the printer unit 932 so as to work of image scanning and image printing as the image forming apparatus 9. The printer unit 932 To the ASIC 906, a Universal Serial Bus (USB) interface or an Institute of Electrical and Electronics Engineers 1394 (IEEE 1394) interface may be coupled.

The short-distance communication circuit 920 includes a card reader 920a for reading authentication information and the like of the user stored in an IC card or the like.

The operation panel 940 includes a touch panel 940a and a numeric keypad 940b that receive input from the user. The touch panel 940a displays an application screen or the like executed by the image forming apparatus 9.

Functional Block

Figure 4:
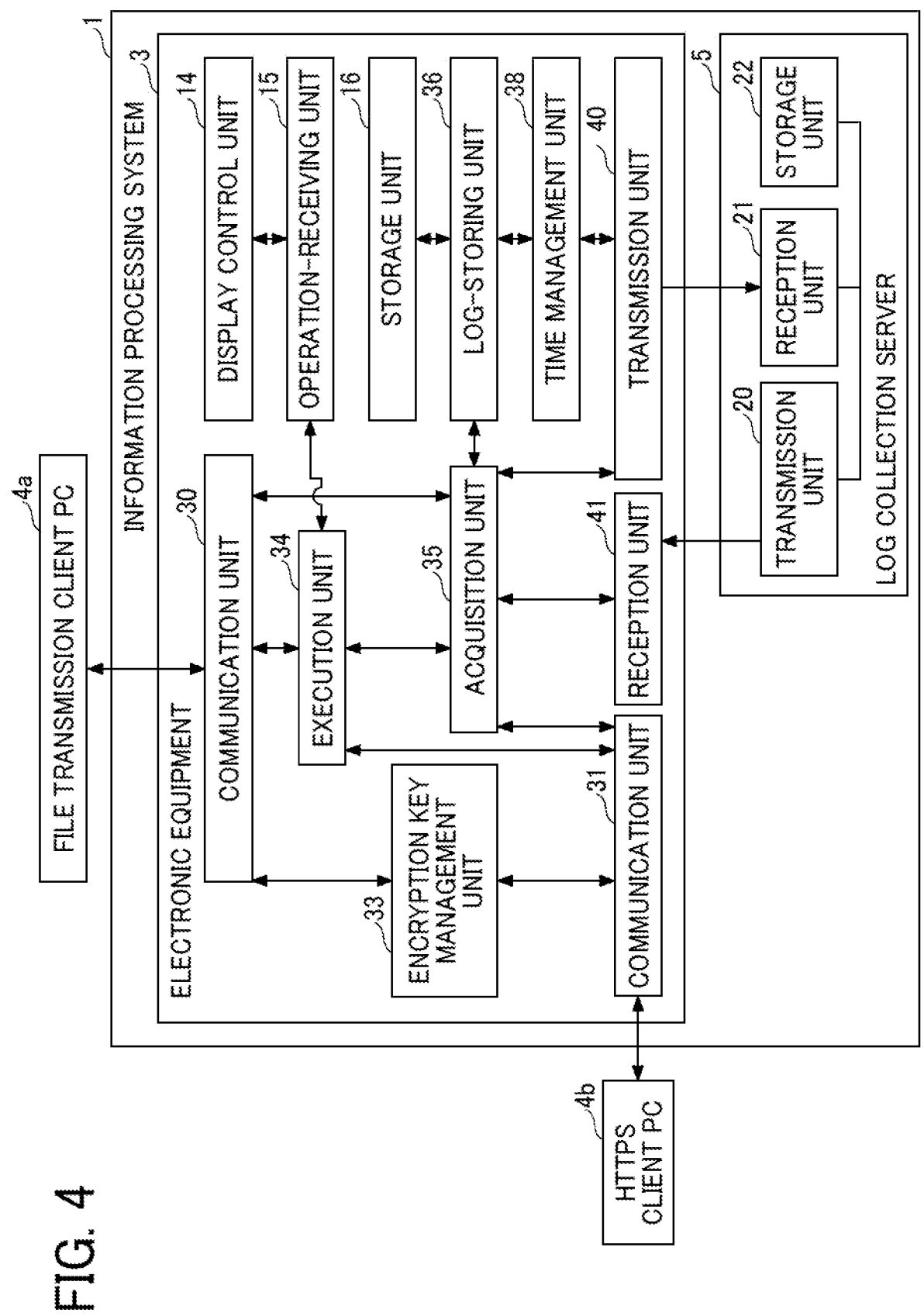
FIG. 4 is a diagram illustrating an example of a configuration diagram of functional blocks in the information processing system according to an embodiment of the present disclosure.

FIG. 4 is a diagram illustrating an example of a configuration diagram of functional blocks in the information processing system 1 according to an embodiment of the present disclosure. The electronic equipment 3 includes a communication unit 30, a communication unit 31, an execution unit 34, an encryption key management unit 33, an acquisition unit 35, a transmission unit 40, a reception unit 41, a log-storing unit 36, a time management unit 38, a display control unit 14, and an operation-receiving unit 15. Each of these units is, for example, functions or a means implemented by the CPU 501 executing commands included in one or more programs installed in an information processing apparatus constituting the electronic equipment 3. Alternatively, each of these unit is, for example, functions or a means implemented by the CPU 901 executing commands included in one or more programs installed in the image forming apparatus 9 constituting the electronic equipment 3. A storage unit 16 may be implemented by, for example, a storage device, such as the HD 504 of the information processing apparatus or the HD 909 of the image forming apparatus 9.

The communication unit 30 provides server functions in a protocol, such as Secure Shell File Transfer Protocol (SFTP), for performing communication related to file transmission with a file transmission client PC 4a. The electronic equipment 3 receives, for example, a document file to be printed, from the file transmission client PC 4a via the communication unit 30.

The communication unit 31 provides server functions for performing communication with a Hypertext Transfer Protocol Secure (HTTPS) client PC 4b using HTTPS. The electronic equipment 3 receives, for example, a request message for executing printing of a document file or the like, from the HTTPS client PC 4b via the communication unit 31.

The encryption key management unit 33 generates an encryption key used for encrypted communication in the communication unit 30 and the communication unit 31, and stores and manages the generated encryption key.

The execution unit 34 uses the functions of the electronic equipment 3 to execute processing, such as printing and copying. For example, the execution unit 34 uses a printing function of the electronic equipment 3 to print a document file or the like received by the electronic equipment 3 from the file transmission client PC 4a via the communication unit 30. Alternatively, the execution unit 34 uses a copying function of the electronic equipment 3 to execute copying.

The acquisition unit 35 acquires logs related to communication, from the communication unit 30, the communication unit 31, the transmission unit 40, and the reception unit 41, and acquires logs related to execution of processing, such as printing and copying, from the execution unit 34. The logs related to communication include a log of a response received from the log collection server 5 and related to success in log transmission. The acquisition unit 35 also transmits, to the transmission unit 40, the received logs related to communication, and the received logs related to processing execution, to transmit, to the log collection server 5, the received logs related to communication, and the received logs related to processing execution. The acquisition unit 35 transmits, to the log-storing unit 36, the received logs related to communication, to store the received logs related to communication, in the storage device of the electronic equipment 3.

The transmission unit 40 transmits the logs received from the acquisition unit 35, to a reception unit 21 of the log collection server 5. As the log transmission method, there are two types of transmission modes of sequential transmission and periodic transmission. In the sequential transmission, the log transmission is executed when the acquisition unit 35 acquires a log. In the periodic transmission, the log transmission is executed not at a timing when the acquisition unit 35 acquires a log, but at a timing of a fixed cycle (for example, 60 minutes) notified from the time management unit 38. However, in a case where the acquisition unit 35 has not acquired a log, the log transmission may not be executed.

The reception unit 41 receives, from a transmission unit 20 of the log collection server 5, a response related to success in the log transmission.

The log-storing unit 36 stores, in the storage unit 16 of the electronic equipment 3, the logs received from the acquisition unit 35 and related to communication. The log-storing unit 36 may store the logs in the storage unit 16 of the electronic equipment 3 on the basis of a timing of a fixed cycle (for example, 60 minutes) notified from the time management unit 38. That is, from the viewpoint of efficiency, during a fixed cycle from the log-storing unit 36 storing logs in the storage unit 16, even if the log-storing unit 36 receives a log from the acquisition unit 35, the log-storing unit 36 may not store the log in the storage unit 16.

In a case where the log transmission mode is the periodic transmission, the time management unit 38 notifies, in a predetermined fixed cycle, the transmission unit 40 of a log transmission execution timing. Further, for example, in a case where an error occurs in log transmission to the log collection server 5, the time management unit 38 notifies, in a predetermined fixed cycle, the log-storing unit 36 of a timing at which logs related to communication failure are stored in the storage unit 16.

The display control unit 14 displays, on the electronic equipment 3, a menu screen for the user to request execution of processing, such as printing or copying, and the like.

The operation-receiving unit 15 receives, for example, operation by the user via a keyboard or a pointing device of the electronic equipment 3 for requesting execution of printing or copying processing.

The storage unit 16 stores a log related to communication or a log related to execution of processing, such as printing or copying, in the storage device of the electronic equipment 3.

The log collection server 5 includes the transmission unit 20 and the reception unit 21. Each of these units is, for example, functions or a means implemented by the CPU 501 executing commands included in one or more programs installed in an information processing apparatus constituting the log collection server 5. A storage unit 22 may be implemented by, for example, a storage device, such as the HD 504, of the information processing apparatus constituting the log collection server 5.

The transmission unit 20 is a data transmission function of the log collection server 5. For example, the transmission unit 20 transmits, to the reception unit 41 of the electronic equipment 3 via the communication network 2, a response indicating success in log transmission.

The reception unit 21 is a data reception function of the log collection server 5. For example, the reception unit 21 receives a log from the transmission unit 40 of the electronic equipment 3 via the communication network 2.

The storage unit 22 stores logs received from the electronic equipment 3, in the storage device of the log collection server 5.

Sequence Diagram related to Log Storing and Log Transmission Processing

Figure 5:
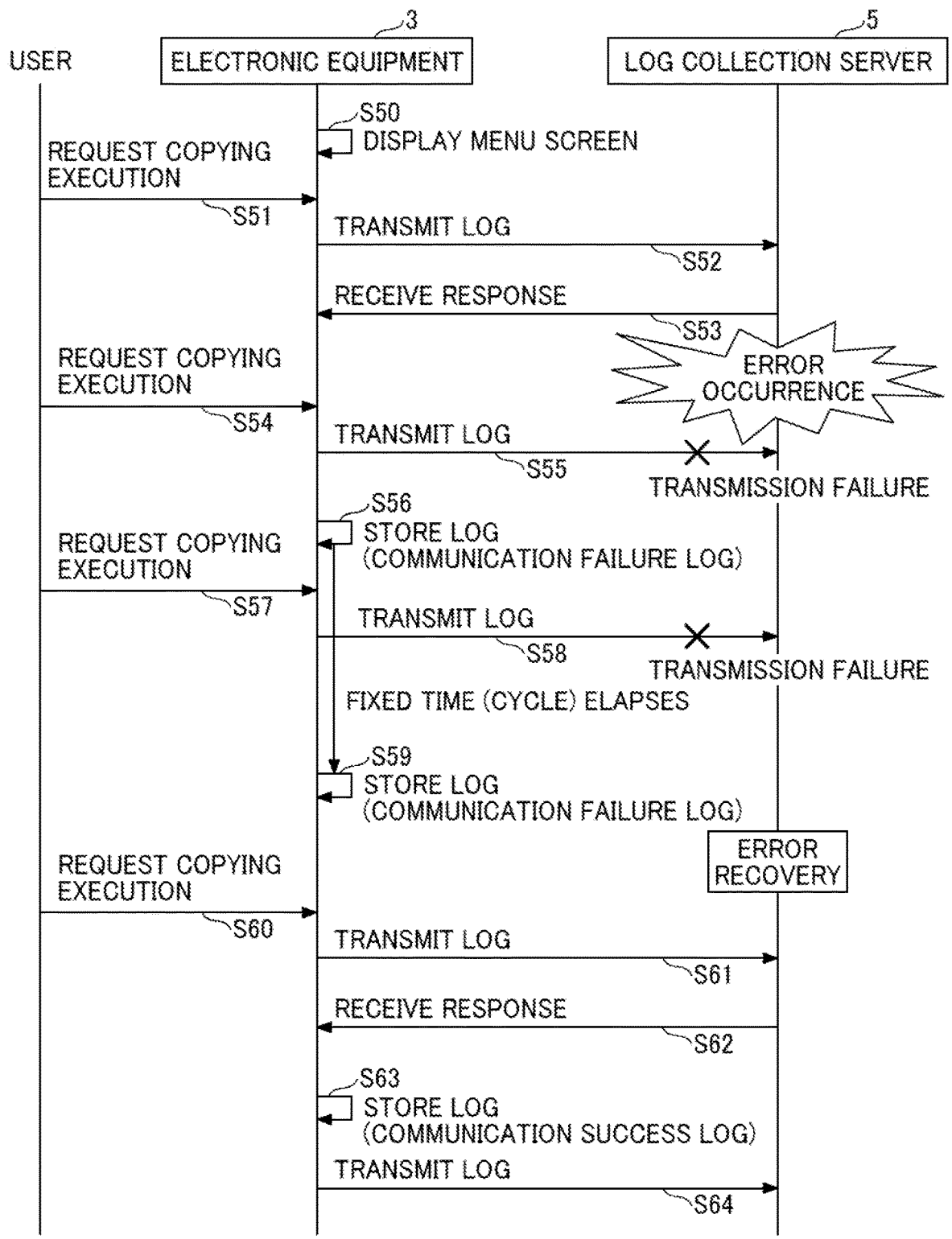
FIG. 5 is a diagram illustrating an example of a sequence related to log storing and log transmission processing according to an embodiment of the present disclosure.

FIG. 5 is a diagram illustrating an example of a sequence related to log storing and log transmission processing according to an embodiment of the present disclosure. In this sequence, when the user operates the electronic equipment 3, such as the image forming apparatus 9, to request execution of copying processing, the electronic equipment 3 transmits, to the log collection server 5, a log related to the copying-processing execution (that is, the sequential-transmission mode), and receives, from the log collection server 5, a response to the transmission of the log. From the viewpoint of efficiency, in a case where an error occurs in the log collection server 5, the electronic equipment 3 does not store logs related to the communication error every time, but stores the logs in a fixed cycle. When an error in the log collection server 5 is recovered, if the electronic equipment 3 successfully receives, from the log collection server 5, a response to the log transmission, the electronic equipment 3 stores, in the storage device, a log related to the reception of the response. A second storage unit of the log collection server 5 stores, in the storage device, the logs received from the electronic equipment 3. Hereinafter, processing of each step in FIG. 5 will be described.

Step S50: The display control unit 14 of the electronic equipment 3 displays, on the touch panel 940a of the electronic equipment 3, a menu screen for the user to perform operation to request execution of processing, such as copying.

Step S51: The operation-receiving unit 15 of the electronic equipment 3 receives operation by the user to request execution of copying processing.

Step S52: On the basis of the request from the user, the execution unit 34 of the electronic equipment 3 executes copying processing using a copying function of the electronic equipment 3. The acquisition unit 35 of the electronic equipment 3 acquires, from the execution unit 34, a log related to the copying-processing execution. The transmission unit 40 of the electronic equipment 3 transmits, to the reception unit 21 of the log collection server 5, the log related to the copying-processing execution.

Step S53: The transmission unit 20 of the log collection server 5 transmits, to the reception unit 41 of the electronic equipment 3, a response to success in the log transmission from the transmission unit 40 of the electronic equipment 3 (log transmission success response).

An error occurs in the log collection server 5, and the log collection server 5 is into a state where communication with the electronic equipment 3 is impossible.

Step S54: The operation-receiving unit 15 of the electronic equipment 3 receives operation by the user to request execution of copying processing.

Step S55: On the basis of the request from the user, the execution unit 34 of the electronic equipment 3 executes copying processing using a copying function of the electronic equipment 3. The acquisition unit 35 of the electronic equipment 3 acquires, from the execution unit 34, a log related to the copying-processing execution. The transmission unit 40 of the electronic equipment 3 tries to transmit the log related to the copying-processing execution, to the reception unit 21 of the log collection server 5, but the transmission of the log fails since the error has been occurring in the log collection server 5. The acquisition unit 35 of the electronic equipment 3 acquires, from the transmission unit 40 of the electronic equipment 3, a log related to the log transmission failure (transmission failure log).

Step S56: Since the last log transmission has been successful and the present log transmission has failed, the log-storing unit 36 of the electronic equipment 3 stores the transmission failure log in the storage unit 16 of the electronic equipment 3. While an error occurs, the log-storing unit 36 stores a transmission failure log in the storage unit 16 only once in a predetermined fixed time (cycle) notified from the time management unit 38. That is, even if the log-storing unit 36 receives, from the acquisition unit 35, a plurality of transmission failure logs, the log-storing unit 36 stores the latest log in the storage unit 16 only once within a predetermined fixed time (cycle).

Step S57: The operation-receiving unit 15 of the electronic equipment 3 receives operation by the user to request execution of copying processing.

Step S58: On the basis of the request from the user, the execution unit 34 of the electronic equipment 3 executes copying processing using a copying function of the electronic equipment 3. The acquisition unit 35 of the electronic equipment 3 acquires, from the execution unit 34, a log related to the copying-processing execution. The transmission unit 40 of the electronic equipment 3 tries to transmit the logs to the reception unit 21 of the log collection server 5, but the log transmission fails since the error has been occurring in the log collection server 5. These logs that have been tried to be transmitted by the transmission unit 40 include information related to the copying-processing execution in steps S54 and S57 and the log transmission failure in step S55. The acquisition unit 35 of the electronic equipment 3 acquires, from the transmission unit 40 of the electronic equipment 3, a log related to the log transmission failure (transmission failure log). Since the predetermined fixed time has not elapsed from the last storing of the log, the log-storing unit 36 does not store, in the storage unit 16, the log related to the log transmission failure in step S58 (transmission failure log).

Step S59: When the predetermined fixed time (cycle) elapses from the last storing of the log related to the log transmission failure, the log-storing unit 36 of the electronic equipment 3 stores, in the storage unit 16, the log related to the log transmission failure received from the acquisition unit 35 (transmission failure log).

The error in the log collection server 5 is recovered, and the log collection server 5 is into a state where communication with the electronic equipment 3 is possible.

Step S60: The operation-receiving unit 15 of the electronic equipment 3 receives operation by the user to request execution of copying processing.

Step S61: On the basis of the request from the user, the execution unit 34 of the electronic equipment 3 executes copying processing using a copying function of the electronic equipment 3. The acquisition unit 35 of the electronic equipment 3 acquires, from the execution unit 34, a log related to the copying-processing execution. The transmission unit 40 of the electronic equipment 3 transmits the logs to the reception unit 21 of the log collection server 5. These transmitted logs include information related to the copying-processing execution in steps S54, S57, and S60 and the log transmission failure in steps S55 and S58 (that is, information related to the logs acquired during the occurrence of the error).

Step S62: The transmission unit 20 of the log collection server 5 transmits, to the reception unit 41 of the electronic equipment 3, a response to success in the log transmission from the transmission unit 40 of the electronic equipment 3. The acquisition unit 35 of the electronic equipment 3 acquires, from the reception unit 41 of the electronic equipment 3, a log related to the response to the success in the log transmission (transmission success log).

Step S63: After the log transmission has failed due to the error, the error has been recovered and the log transmission has been successful, and thus the log-storing unit 36 of the electronic equipment 3 stores, in the storage unit 16, the log related to the response to the success in the log transmission (transmission success log).

Step S64: The transmission unit 40 of the electronic equipment 3 transmits, to the reception unit 21 of the log collection server 5, the log related to the response to the success in the log transmission (transmission success log) acquired by the acquisition unit 35 of the electronic equipment 3 in step S62.

Examples of Logs to be Transmitted to Log Collection Server

FIG. 6 is a table for explaining logs to be transmitted to the log collection server according to an embodiment of the present disclosure.

In the sequence of FIG. 5, a log to be transmitted from the electronic equipment 3 to the log collection server 5 includes, for example, items of a log identification (ID) 80, an execution content 81, and an execution date and time 82 illustrated in FIG. 6. Items of a transmission result 83 and an error occurrence 84 illustrated in FIG. 6 are items described to describe a state at a time when a log is transmitted, and are not items included in a log to be transmitted.

The log ID 80 is an identifier for identifying a log. As the identifier, a three-digit number is used. In parentheses to the right, a step number at a time when a log corresponding to the identifier is transmitted in the sequence of FIG. 5 is indicated for the sake of explanation. For example, the log whose log ID 80 corresponds to "001" is the log transmitted in step S52 of FIG. 5.

The execution content 81 indicates a content of executed processing, such as "coping execution", "log transmission failure", and "log transmission success". The execution content 81 may include a plurality of contents. In parentheses to the right, a step number at a time when a corresponding content is executed in the sequence of FIG. 5 is indicated for the sake of explanation.

The execution date and time 82 indicates a date and time when processing indicated in the execution content 81 has been executed.

The transmission result 83 indicates whether or not a log identified by the log ID 80 has been successfully transmitted.

The error occurrence 84 indicates whether or not an error has been occurring when a log identified by the log ID 80 is transmitted.

As illustrated in FIG. 6, an error has been occurring at the times of transmission of the logs whose log IDs 80 are "002" and "003", and the transmission of the logs has failed. However, at the time of transmission of the log whose log ID 80 is "004", the error has been recovered, and the log transmission has been successful. Further, in the information processing system 1, the electronic equipment 3 transmits, to the log collection server 5, the log whose log ID 80 is "005" indicating the success in the log communication. As described with reference to FIG. 5, the electronic equipment 3 not only transmits, to the log collection server 5, the log related to the communication, but also stores the log in the storage device of the electronic equipment 3. As a result, in the information processing system 1, on the basis of the execution date and time 82 of the log whose log ID 80 is "005" indicating the success in the log transmission, the date and time when the error has been recovered is tracked.

Flowchart related to Processing of Log Storing and Log Transmission

Figure 7:
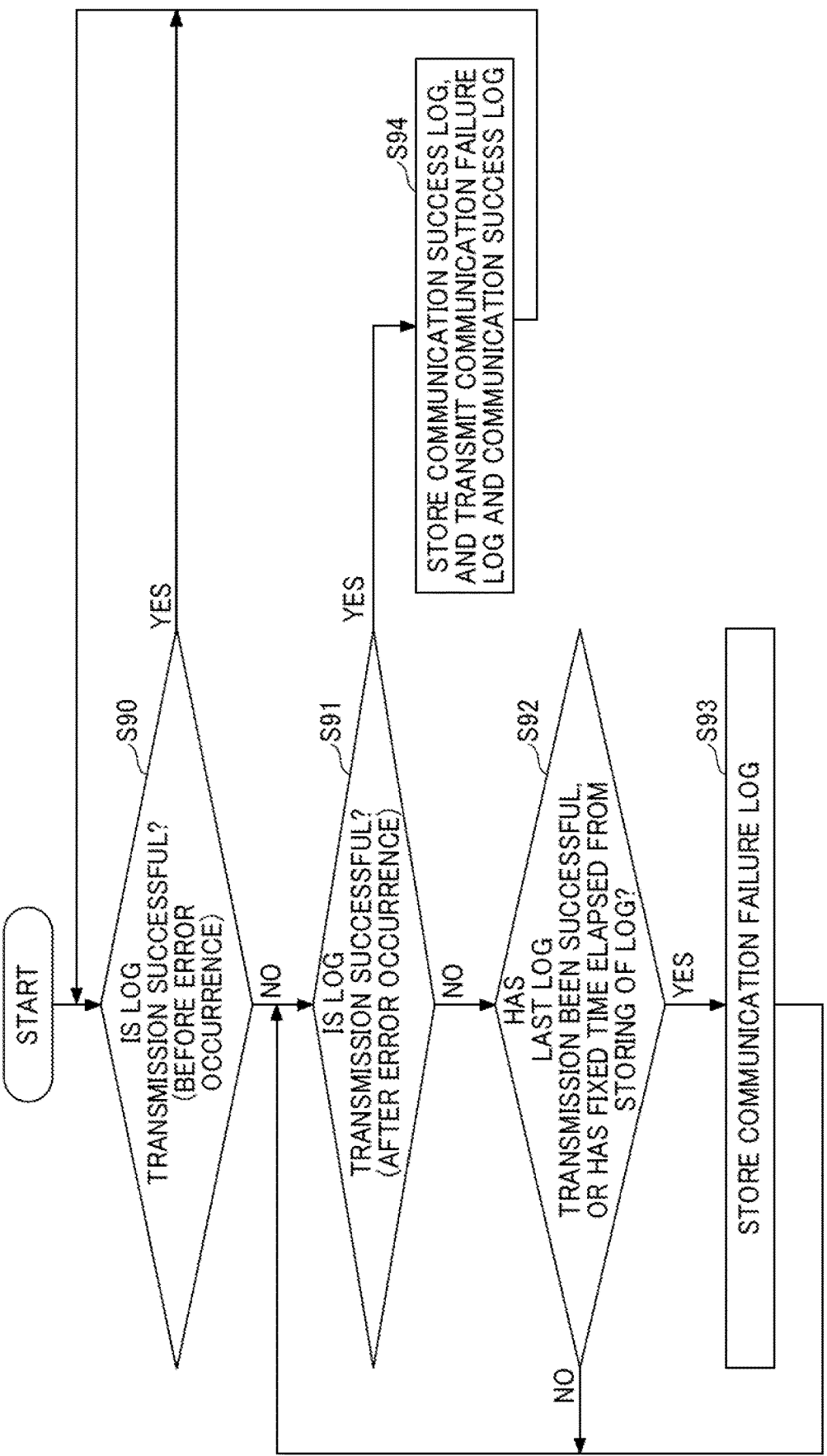
FIG. 7 is a diagram illustrating an example of a flowchart related to processing of log storing and log transmission according to an embodiment of the present disclosure.

FIG. 7 is a diagram illustrating an example of a flowchart related to processing of log storing and log transmission according to an embodiment of the present disclosure. In the flowchart of FIG. 7, a flow of processing in which the electronic equipment 3 stores, in the storage device, a log related to communication, and processing in which the electronic equipment 3 transmits the log to the log collection server 5 is described.

Hereinafter, the processing of each step in FIG. 7 will be described.

Step S90: Before an error occurs, similarly to, for example, the processing in step S52 of FIG. 5, after execution of processing, such as copying, occurs, the transmission unit 40 of the electronic equipment 3 transmits the log to the reception unit 21 of the log collection server 5. If the log transmission is successful, the transmission unit 40 of the electronic equipment 3 repeats the processing of this step. If the log transmission fails, the transmission unit 40 of the electronic equipment 3 makes a transition of the processing to step S91.

Step S91: After occurrence of an error, when execution of processing, such as copying, occurs again, the transmission unit 40 of the electronic equipment 3 transmits the log to the reception unit 21 of the log collection server 5. If the transmission of the log is successful, the transmission unit 40 of the electronic equipment 3 makes a transition of the processing to step S94. If the transmission of the log fails, the transmission unit 40 of the electronic equipment 3 makes a transition of the processing to step S92.

Step S92: If the last log transmission has been successful, or if a predetermined fixed time has elapsed from execution of storing of a transmission failure log, the transmission unit 40 of the electronic equipment 3 makes a transition of the processing to step S93. If the last log transmission has not been successful, or if a predetermined fixed time has not elapsed from execution of storing of a transmission failure log, the transmission unit 40 of the electronic equipment 3 makes a transition of the processing to step S91. The "the last log transmission has been successful" corresponds to step S56 of FIG. 5. The "a predetermined fixed time has elapsed from execution of storing of a transmission failure log" corresponds to step S59 of FIG. 5.

Step S93: The log-storing unit 36 of the electronic equipment 3 stores a transmission failure log in the storage unit 16 of the electronic equipment 3.

Step S94: Similarly to the processing in step S63 of FIG. 5, the log-storing unit 36 of the electronic equipment 3 stores a transmission success log in the storage unit 16 of the electronic equipment 3. Similarly to the processing in steps S61 and S64 of FIG. 5, the transmission unit 40 of the electronic equipment 3 transmits, to the reception unit 21 of the log collection server 5, logs acquired while the error has occurred, and a transmission success log.

Due to the above processing, in the information processing system 1, after log transmission fails due to an error, when the error is recovered and log transmission is successful, a log related to the transmission success is stored to track a period in which the error has occurred. In addition, in the information processing system 1, when an error is recovered, logs acquired during the occurrence of the error (logs related to processing execution and communication) are transmitted to the log collection server 5.

Although some embodiments for carrying out the present disclosure have been described above, the present disclosure is not limited to such embodiments at all, and various modifications and substitutions may be made without departing from the gist of the present disclosure.

For example, an example of a configuration diagram of functional blocks of FIG. 4 is divided according to main functions to facilitate understanding of processing by the electronic equipment 3, such as the image forming apparatus 9, and the information processing apparatus. The present disclosure of the present application is not limited by the way of division of units of the processing, or names. The processing in the electronic equipment 3, such as the image forming apparatus 9, and the information processing apparatus may be divided into more units of processing according to processing contents. Alternatively, the processing in the electronic equipment 3, such as the image forming apparatus 9, and the information processing apparatus may be divided in such a manner that one unit of processing includes more processing.

Each of the functions of the above-described embodiments may be implemented by one or a plurality of processing circuits or circuitry. Processing circuitry includes a processor programmed so that software executes the functions, such as a processor implemented by an electronic circuit. The "processing circuit" herein also includes devices, such as an application-specific integrated circuit (ASIC), a digital signal processor (DSP), a field-programmable gate array (FPGA), and conventional circuit modules, designed to execute the recited functions.

The set of described apparatuses are merely indicative of one of a plurality of computing environments for implementing the embodiments disclosed herein. In an embodiment, the electronic equipment 3, such as the image forming apparatus 9, and the information processing apparatus include a plurality of computing devices, such as a server cluster. The plurality of computing devices communicates with each other via any type of communication link, such as a network, or a shared memory, and implements the processing disclosed herein.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An information processing apparatus, comprising
a memory storage configured to store a log related to communication between the information processing apparatus and a log collection server and a log related to execution of a processing that is executed by the information processing apparatus; and
processing circuitry configured to:
acquire the log related to the execution of the processing;
transmit the log related to the execution of the processing to the log collection server before a transmission failure occurs;
periodically store at least one log related to a transmission failure in the memory storage at a predetermined interval after the transmission failure occurs, said at least one log being accumulated at the predetermined interval, said transmission failure being defined as a failure of transmission of the log from the information processing apparatus to the log collection server due to occurrence of an error;
when the transmission of the log to the log collection server succeeds after the transmission failure,
store a log related to a transmission success in the memory storage,
transmit, to the log collection server, all logs accumulated in the memory storage after the transmission failure and including:
logs related to all executed processes that are executed by the information processing apparatus between the transmission failure and a transmission success and execution dates and times of the all executed processes,
the at least one log related to the transmission failure that are accumulated in the memory between the transmission failure and the transmission success, and
the log related to the transmission success, and
transmit the log related to the execution of the processing to the log collection server after transmitting all of the logs accumulated in the memory storage after the transmission failure and until the transmission success.

2. An information processing system, comprising:
the information processing apparatus according to claim 1; and
the log collection server including:
processing circuitry configured to receive a log from the information processing apparatus; and
a memory storage configured to store the log.

3. An image forming apparatus, comprising:
the information processing apparatus according to claim 1; and
an image former configured to form an image.

4. An image forming system, comprising:
the image forming apparatus according to claim 3; and
the log collection server including:
processing circuitry configured to receive a log from the information processing apparatus; and
a memory storage configured to store the log.

5. The information processing apparatus according to claim 1, the processing circuitry is configured to wait, until the predetermined interval elapses, to store, in the memory storage, logs related to transmission failures that are accumulated after the last storing of the log related to the transmission failure in the memory storage.

6. An information processing method performed by an information processing system including a memory storage configured to store a log related to communication between the information processing apparatus and a log collection server and a log related to execution of a processing that is executed by the information processing apparatus, said method comprising:

acquiring the log related to the communication and the execution of the processing;

transmitting the log related to the execution of the processing to the log collection server before a transmission failure occurs;

periodically storing at least one log related to a transmission failure in the memory storage at a predetermined interval after the transmission failure occurs, said at least one log being accumulated at the predetermined interval, said transmission failure being defined as a failure of the transmitting of the log from the information processing apparatus to the log collection server due to occurrence of an error;

when the transmitting of the log to the log collection server succeeds after the transmission failure, storing a log related to a transmission success in the memory storage, transmitting, to the log collection server, all logs accumulated in the memory storage after the transmission failure and including:

logs related to all executed processes that are executed by the information processing apparatus between the transmission failure and the transmission success and execution dates and times of the executed processes, the at least one log related to the transmission failure and the log related to the transmission success, and transmitting the log related to the execution of the processing to the log collection server after transmitting all of the logs accumulated in the memory storage after the transmission failure and until the transmission success.

* * * * *